H. KELLEY & W. H. LOCKE.
Improvement in Lamp-Collars.

No. 114,302.             Patented May 2, 1871.

Witnesses:
Fred. Artos
W. N. Martin

Inventors:
Henry Kelley
Wm. H. Locke
by his attys A.H. & R.K. Evans

United States Patent Office.

HENRY KELLEY AND WILLIAM H. LOCKE, OF BOSTON, MASSACHUSETTS.

Letters Patent No. 114,302, dated May 2, 1871.

IMPROVEMENT IN LAMP-COLLARS.

The Schedule referred to in these Letters Patent and making part of the same.

*To all whom it may concern:*

Be it known that we, HENRY KELLEY and WILLIAM H. LOCKE, both of the city of Boston and State of Massachusetts, have invented a new and useful Improvement in Metal Lamp-Collars, of which the following is a full, clear, and exact description, reference being had to the accompanying drawing making a part of this specification, in which—

Figure 1:
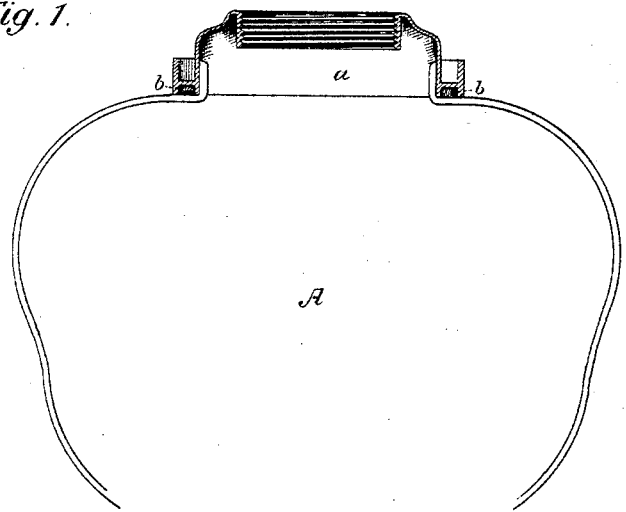
Figure 2:
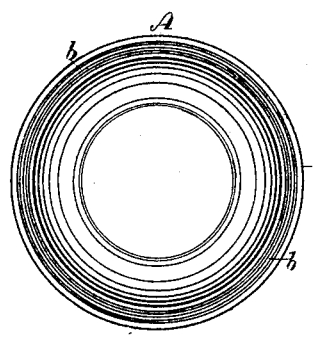

Figure 1 represents a vertical sectional view of a lamp with my improved collar attached thereto, and Figure 2 represents an inverted plan view of the collar detached from the lamp.

Our invention relates to that class of lamp-collars designed for oil-lamps, and consists in providing the collar with a drip-cup, and in forming around the outer and under edge of the collar a groove or receptacle to be filled with a rubber or other suitable elastic packing to prevent the escape of oil from the reservoir, and thereby prevent the inconvenience hitherto experienced in the use of oil-lamps.

To enable others skilled in the art to make and understand our invention, we will proceed to describe the manner in which we have carried it out.

In the drawing—

A represents an ordinary oil-lamp, and

*a* the collar attached thereto.

Around the upper edge is shown what is usually termed the drip-cup, to arrest and hold the oil escaping from the burner. Below this, and on the under side of the collar *a*, we form a groove, *b*, for holding a rubber or other suitable packing, and when the collar is attached to the lamp this packing is pressed tightly between the collar and the shoulder of the oil-reservoir, thus rendering the connection between the collar and reservoir secure against the possibility of the escape of the oil between them, thus preventing wastage or leakage.

Having thus described our invention,

What we claim as new, and desire to secure by Letters Patent, is—

A lamp-collar formed with a drip-cup, and with a groove or receptacle on its under side for the reception of a rubber or other suitable packing, substantially as and for the purpose set forth.

HENRY KELLEY.
      WILLIAM H. LOCKE.

Witnesses:
 JOSEPH WHITE,
 THOMAS KELLEY,
 JOSEPH P. ROGERS.